(12) United States Patent
Cote (10) Patent No.: US 9,282,726 B2
(45) Date of Patent: Mar. 15, 2016

(54) BIRD FEEDER

(75) Inventor: Paul L. Cote, Lac Brome (CA)

(73) Assignee: Brome Bird Care Inc., Lac Brome, Quebec (CA)

(*) Notice: Subject to any disclaimer, the term of this patent is extended or adjusted under 35 U.S.C. 154(b) by 471 days.

(21) Appl. No.: 13/573,186

(22) Filed: Aug. 29, 2012

(65) Prior Publication Data
US 2014/0060438 A1 Mar. 6, 2014

(51) Int. Cl.
*A01K 39/01* (2006.01)

(52) U.S. Cl.
CPC .................................. *A01K 39/0113* (2013.01)

(58) Field of Classification Search
CPC .................................................... A01K 39/012
USPC ............ 119/52.2, 52.3, 52.4, 57.8, 57.9, 61.3
See application file for complete search history.

(56) References Cited

U.S. PATENT DOCUMENTS

| | | | | |
|---|---|---|---|---|
| 1,547,953 A * | 7/1925 | Palmer | | 222/510 |
| 2,298,398 A * | 10/1942 | Marshaus | | 119/51.5 |
| 2,711,217 A * | 6/1955 | Gaty | | 119/51.15 |
| 2,847,147 A * | 8/1958 | Land | | 222/341 |
| 3,145,690 A * | 8/1964 | Bachman | | 119/52.3 |
| 3,537,624 A * | 11/1970 | Hartman et al. | | 222/503 |
| 4,144,842 A * | 3/1979 | Schlising | | 119/52.3 |
| 4,646,686 A * | 3/1987 | Furlani | | 119/57.9 |
| 4,798,337 A * | 1/1989 | Shimokawa | | 239/570 |
| RE32,970 E * | 7/1989 | Furlani | | 119/52.3 |
| 5,138,979 A * | 8/1992 | Baird et al. | | 119/51.04 |
| 5,156,112 A * | 10/1992 | Brown | | 119/57.9 |
| 5,163,382 A * | 11/1992 | Morrison | | 119/57.9 |
| 5,195,459 A * | 3/1993 | Ancketill | | 119/57.9 |
| 5,285,748 A * | 2/1994 | Weldin | | 119/57.9 |
| 5,289,796 A * | 3/1994 | Armstrong | | 119/52.3 |
| 5,445,109 A * | 8/1995 | Gray et al. | | 119/57.9 |
| 5,641,096 A * | 6/1997 | Robbins et al. | | 222/284 |
| 5,720,238 A * | 2/1998 | Drakos | | 119/57.9 |
| 5,829,383 A * | 11/1998 | Blanding | | 119/52.3 |
| 5,964,183 A * | 10/1999 | Czipri | | 119/52.3 |
| 6,253,707 B1* | 7/2001 | Cote | | 119/57.9 |
| 6,543,383 B1* | 4/2003 | Cote | | 119/57.8 |
| 6,591,781 B2* | 7/2003 | Hardison | | 119/57.9 |
| 6,604,487 B2* | 8/2003 | Lush | | 119/57.9 |
| 6,640,746 B1* | 11/2003 | Lund | | 119/57.9 |
| 6,758,164 B2* | 7/2004 | Rich | | 119/52.3 |
| 6,918,353 B1* | 7/2005 | Coroneos | | 119/57.1 |
| 7,743,732 B2* | 6/2010 | Webber | | 119/77 |
| 7,861,671 B2* | 1/2011 | Carter et al. | | 119/72 |
| 2002/0139311 A1* | 10/2002 | Cote | | 119/57.9 |
| 2003/0226514 A1* | 12/2003 | Cote | | 119/57.9 |
| 2005/0115988 A1* | 6/2005 | Law et al. | | 222/145.5 |
| 2006/0260553 A1* | 11/2006 | Cote | | 119/57.8 |
| 2008/0295777 A1* | 12/2008 | Cote | | 119/52.3 |

(Continued)

*Primary Examiner* — Brian M O'Hara
*Assistant Examiner* — Morgan T Barlow
(74) *Attorney, Agent, or Firm* — Eric Fincham (57) ABSTRACT

A bird feeder comprising a feed container having a side wall and a plurality of feed openings therein, a shroud extending about the feed container, the shroud having feed openings therein, the feed openings being spaced from the top of the shroud by a distance equal to between 20% and 80% of the total height thereof, a cover, a base, a center tube and a center rod within the center tube, the center rod being secured to the base and the shroud resting on the base, a spring mounted about the center rod, the arrangement being such that the feed openings in the shroud and the feed openings in the side wall are either aligned or misaligned depending on the weight on the shroud.

9 Claims, 12 Drawing Sheets

(56) References Cited

U.S. PATENT DOCUMENTS

| | | | |
|---|---|---|---|
| 2010/0258055 A1* | 10/2010 | Cote | 119/52.3 |
| 2010/0288200 A1* | 11/2010 | Lush | 119/52.3 |
| 2011/0073043 A1* | 3/2011 | Dault | 119/57.9 |
| 2011/0126771 A1* | 6/2011 | Cote | 119/52.3 |
| 2011/0174233 A1* | 7/2011 | Lush | 119/498 |
| 2011/0259272 A1* | 10/2011 | Traska et al. | 119/57.9 |
| 2011/0271910 A1* | 11/2011 | Baynard et al. | 119/51.5 |
| 2012/0037078 A1* | 2/2012 | Bradley | 119/51.5 |
| 2012/0037080 A1* | 2/2012 | Hepp et al. | 119/52.3 |
| 2012/0073505 A1* | 3/2012 | Cote | 119/51.03 |
| 2012/0111278 A1* | 5/2012 | Greenwood et al. | 119/52.2 |

\* cited by examiner

BIRD FEEDER

FIELD OF THE INVENTION

The present invention relates to a bird feeder and more particularly, relates to a bird feeder which may be used with a number of different feeds.

BACKGROUND OF THE INVENTION

Many different bird feeders are known in the art including those which are designed to limit the maximum size of a bird or animal which can access the feed in the feeder. Thus, some people consider some larger birds such as crows, grackles, blue jays and the like to be undesirable. Similarly, some people like to prevent marauders from gaining access to the feed. In particular, squirrels are well known for their ability to reach the feed in a bird feeder and to devour the same. Many approaches have been tried to discourage or prevent squirrels from reaching the bird feeder, including various types of covers and baffles on poles. These seldom work as squirrels have shown a great deal of ingenuity in overcoming such devices.

One approach that has been taken is to utilize a moveable shroud. Such approaches have generally been more successful.

Most feeders are designed to accept seed as a food for the birds. Although various types of seeds or corn may be utilized, sunflower seed is one of the more preferred feeds.

Another food which is popular with certain types of birds is the peanut. In particular, woodpeckers find peanuts very desirable. To date, most peanut feeders simply comprise a container having a wire mesh which is sized to prevent the peanuts from falling out but permit the birds to insert their beak to remove portions of the nuts.

Another food which resembles peanuts recently started to be marketed. These are manufactured nuggets of food of a size similar to peanuts.

SUMMARY OF THE INVENTION

It is an object of the present invention to provide a bird feeder which is squirrel resistant and can handle food such as peanuts and nuggets.

According to one aspect of the present invention, there is provided a bird feeder comprising a feed container having a side wall, a plurality of feed openings in the side wall, a shroud extending about the feed container, the shroud having feed openings therein, the feed openings being located between a bottom of the shroud and a top of the shroud, the feed openings being spaced from the top of the shroud by a distance equal to between 20% and 80% of the total height of the shroud, a cover secured to an upper portion of the shroud, a base, a center tube, and a center rod within the center tube, the center rod being secured to the base, the shroud resting on the base, a spring mounted about the center rod, the spring being biased at an upper end against a moveable stopper secured to the center rod, the spring being biased at a lower end against a fixed stopper secured to the center tube, and the arrangement being such that the feed openings in the shroud and feed openings in the side wall of the feed container are normally aligned to permit access to feed within the container, the feed openings of the shroud moving out of alignment with the feed openings in the side wall when a predetermined weight is present on the shroud or cover.

Initially, although reference will be made herein to peanuts and manufactured nuggets as the primary use of the feeder, the bird feeder of the present invention could also be employed with some conventional feeds such as sunflower seeds.

The feed container of the present invention has an upper and a lower portion. The upper portion is preferably formed of a suitable plastic material while the lower portion may comprise a wire grid of a size to retain the feed in the container. Typically, the openings would be in a range of between 3 to 8 mm with a range of between 5 to 6 mm being preferred.

The bottom wall of the feed container preferably slopes downwardly from the center tube such that birds may access all the food when only a small amount of the same is present in the feed container.

The shroud extends about the feed container and wire mesh and also extends further downwardly. The extension downwardly is intended to provide support for some birds such as woodpeckers. Woodpeckers use their tail as a support when at feeders and this enables the woodpecker to stay in a natural feeding position.

The shroud is preferably made of an expanded metal and will have the center section with feed openings to permit the birds to access the feed openings in the feed container. Other arrangements such as wire mesh or perforated metal could equally well be utilized. Preferably, the section having the feed openings is spaced from the top of the shroud by a distance equal to between 20% and 80% of the total height of the shroud. More preferably, the feed openings are spaced at a distance equal to between 35% and 65% of the total height of the shroud.

BRIEF DESCRIPTION OF THE DRAWINGS

Having thus generally described the invention, reference will be made to the accompanying drawings illustrating an embodiment thereof, in which:

FIG. 12A is a side elevation view illustrating the center rod while

DETAILED DESCRIPTION OF THE INVENTION

Figure 1:
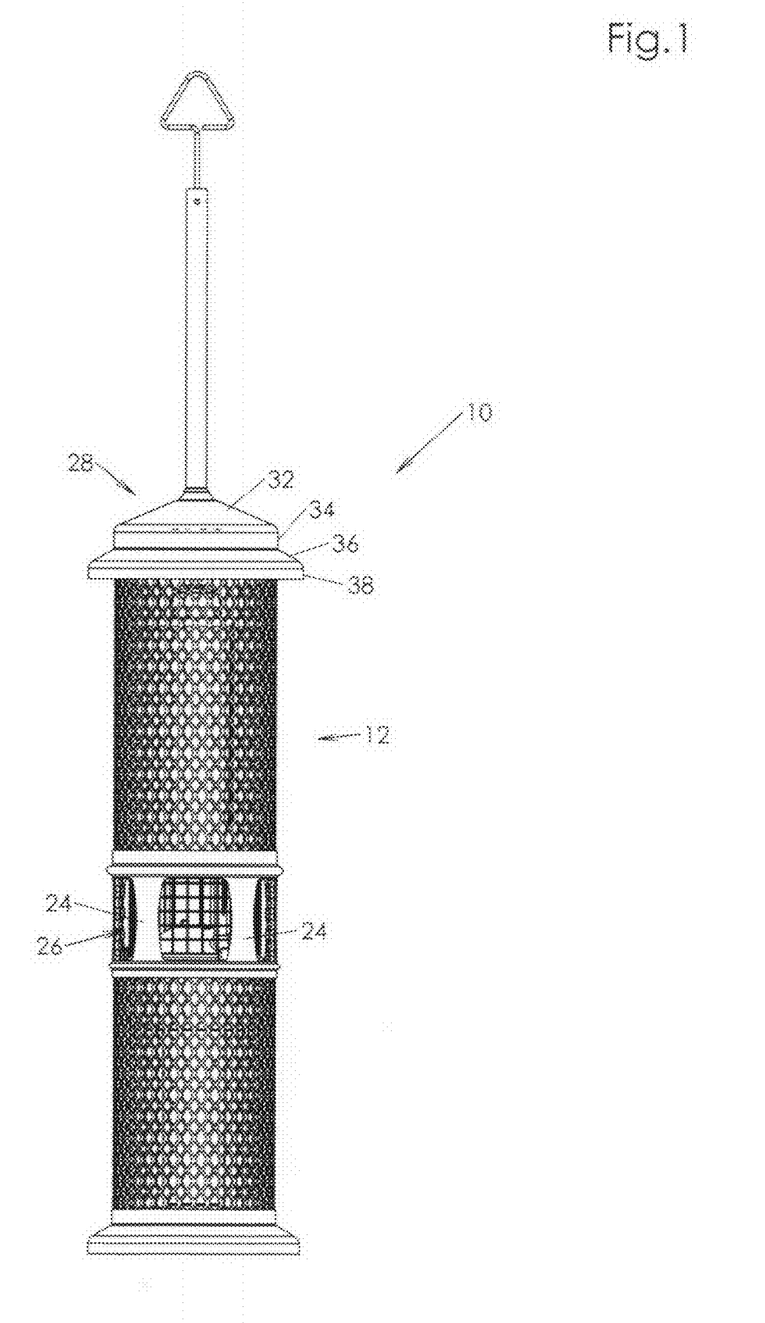
FIG. 1 is an elevational view of a feeder according to the present invention.
Figure 2:
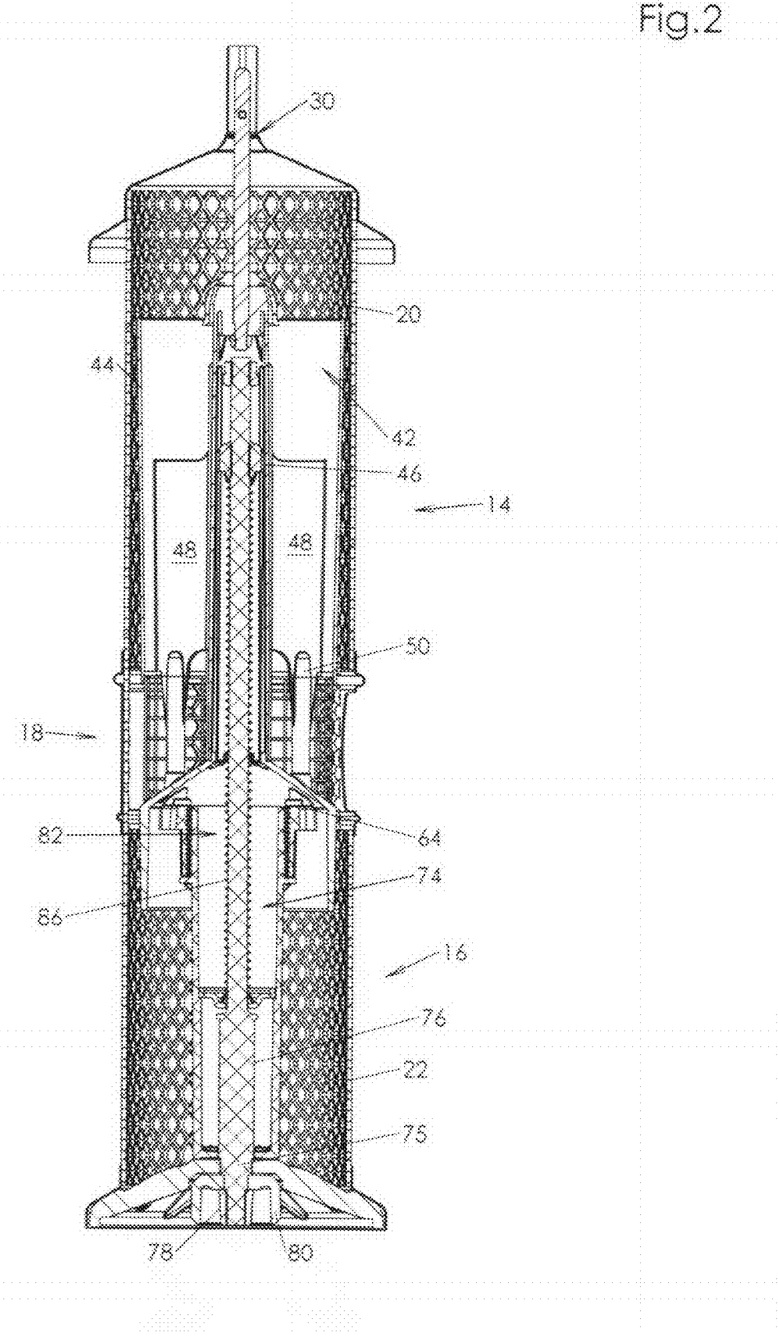
FIG. 2 is a longitudinal sectional view thereof.
Figure 3:
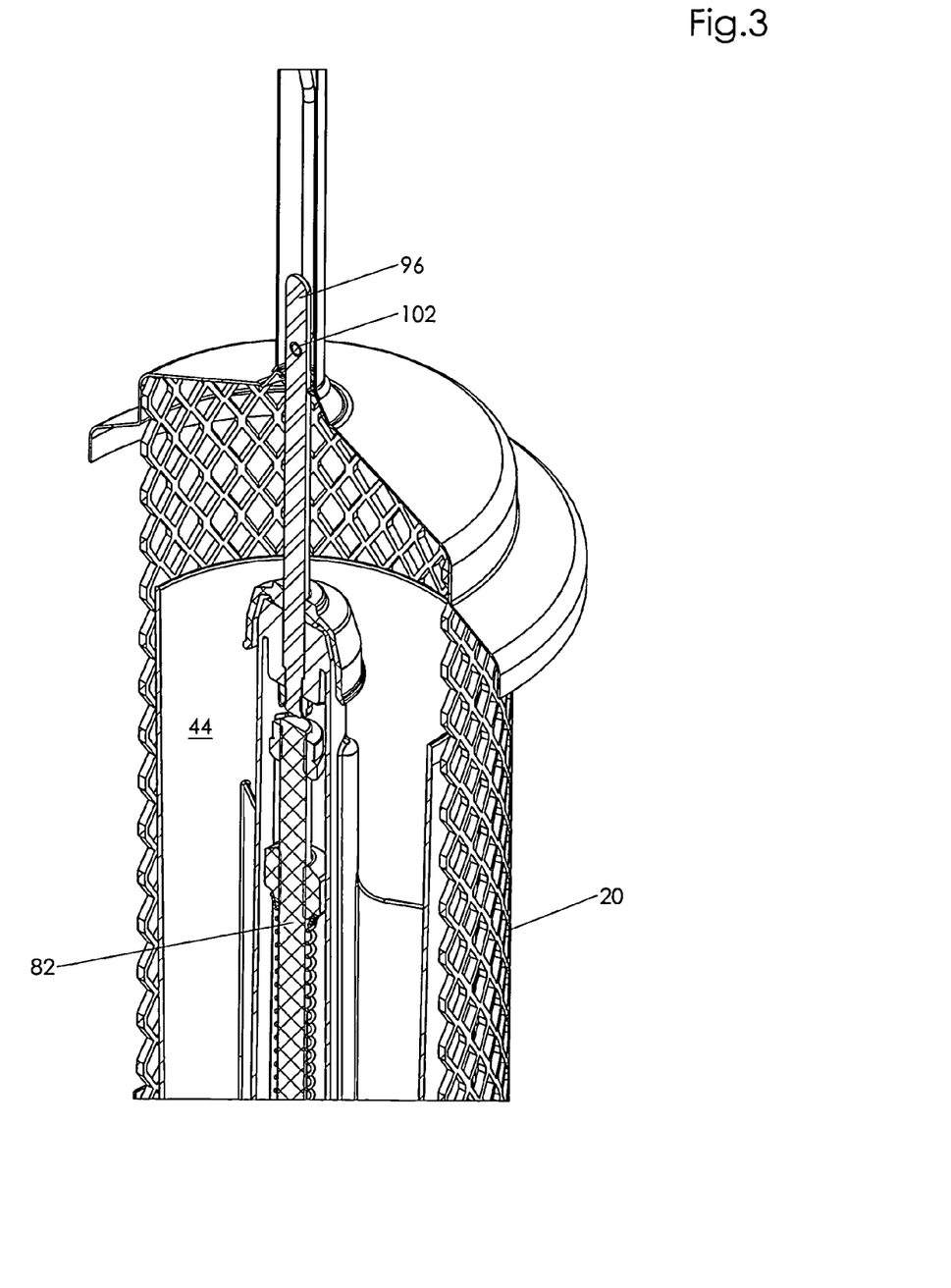
FIG. 3 is a partial cutaway view of the upper portion of the feeder.
Figure 4:
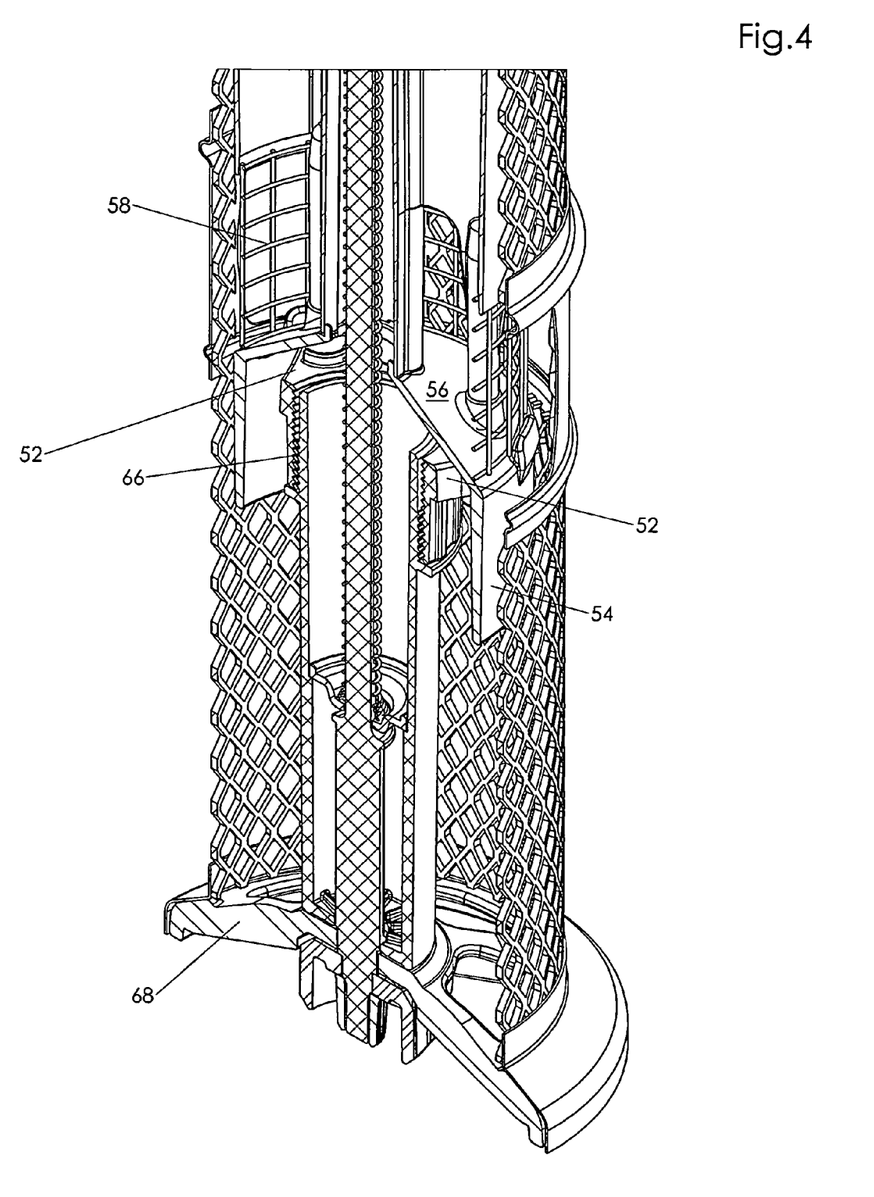
FIG. 4 is a cutaway view illustrating the bottom portion of the feeder.
Figure 5:
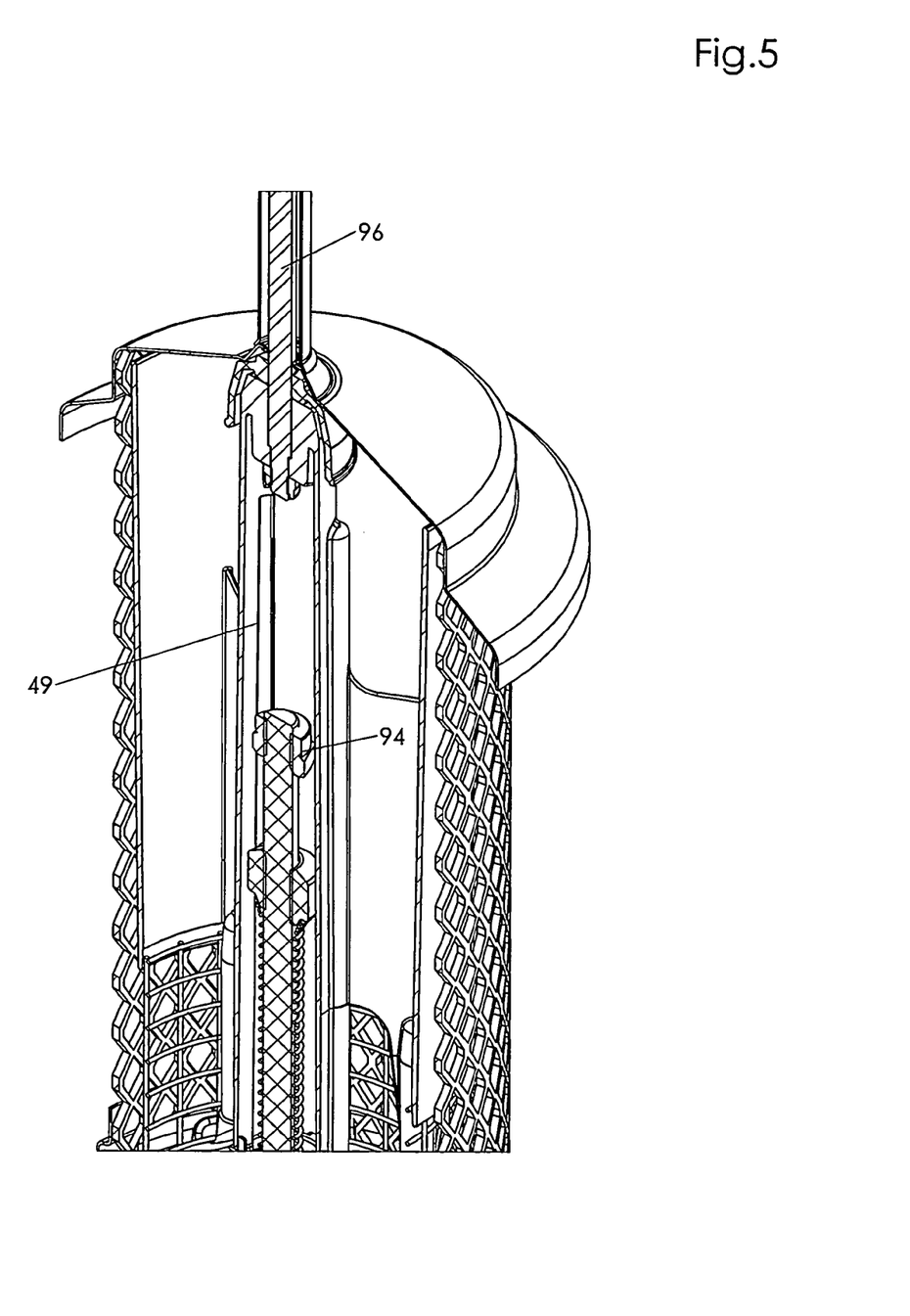
FIG. 5 is a partial cutaway view of an upper portion of the feeder.
Figure 6:
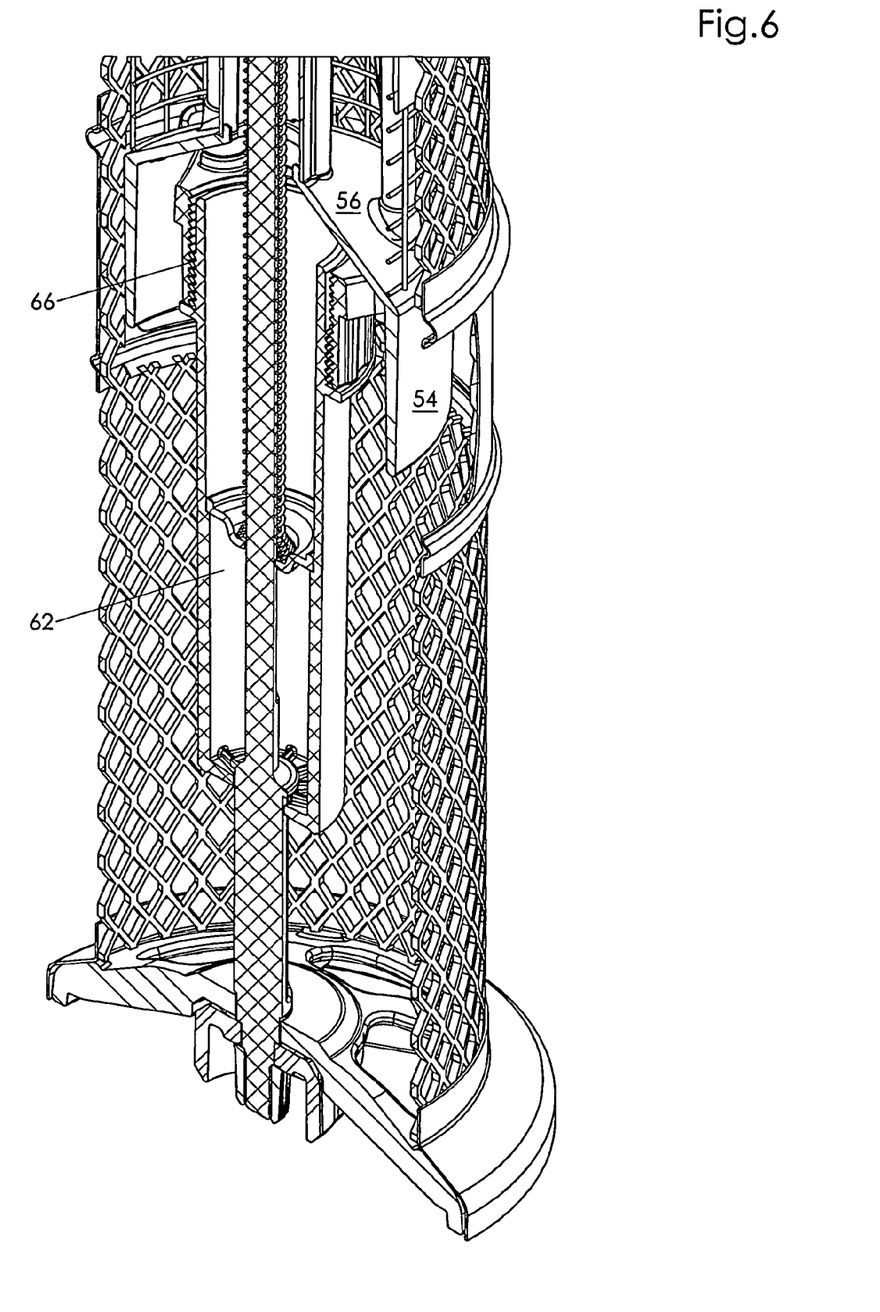
FIG. 6 is a partial cutaway view of the bottom portion of the feeder.
Figure 7:
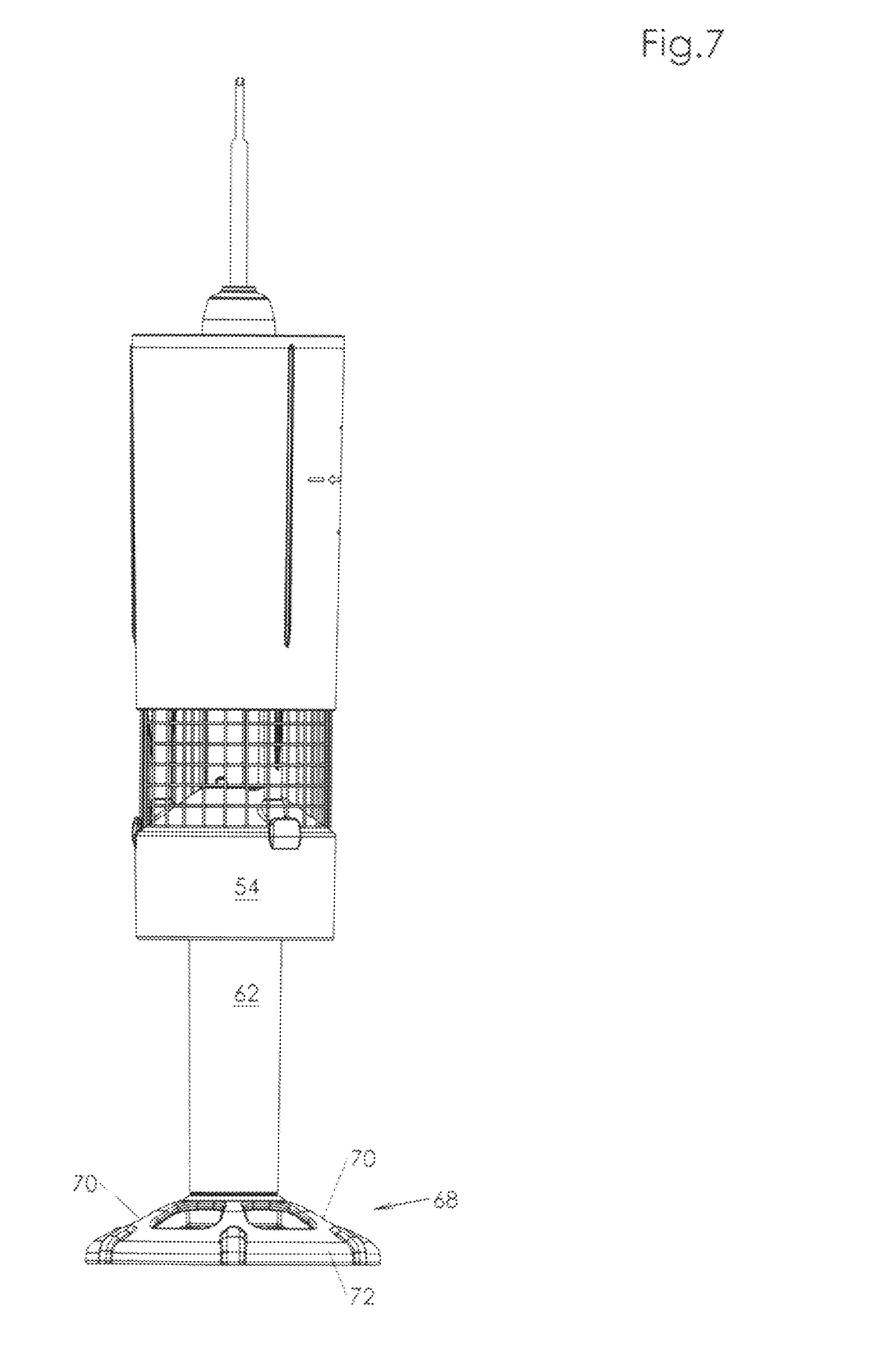
FIG. 7 is an elevation view of the feeder with the shroud being removed.
Figure 8:
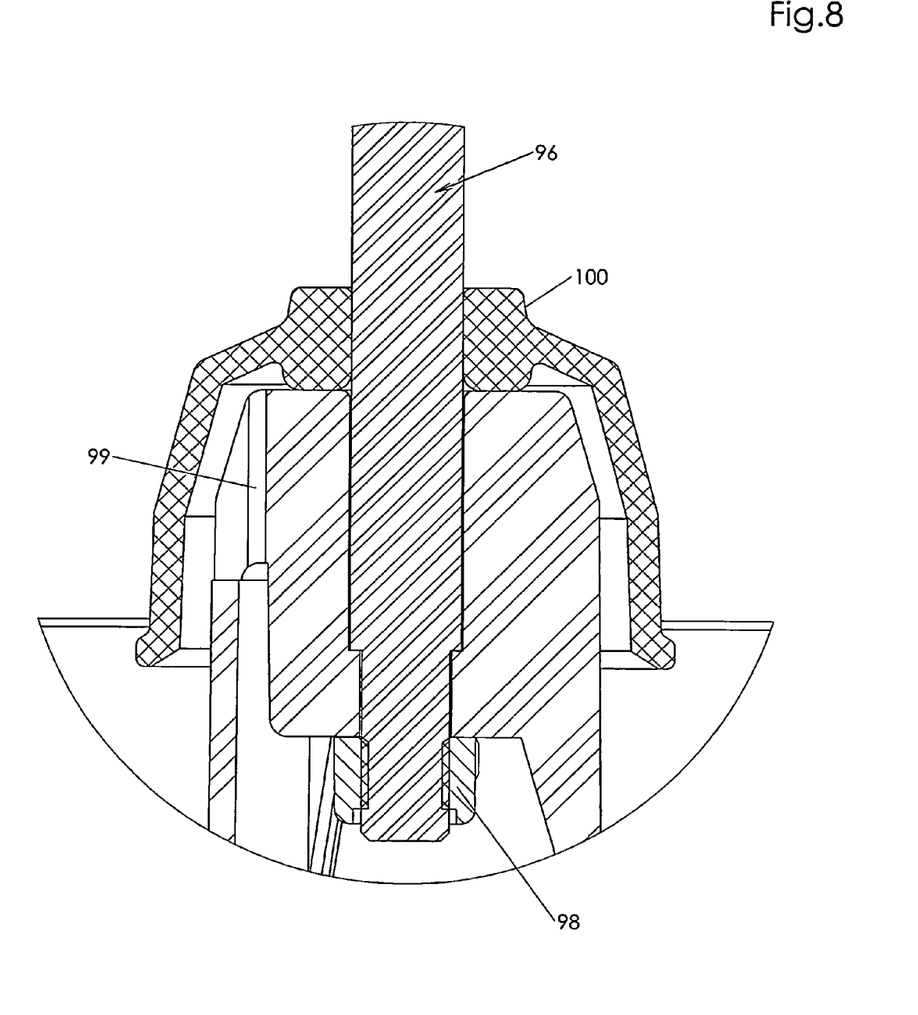
FIG. 8 is an expanded cross-sectional view showing the upper portion of the center rod and center tube.
Figure 9:
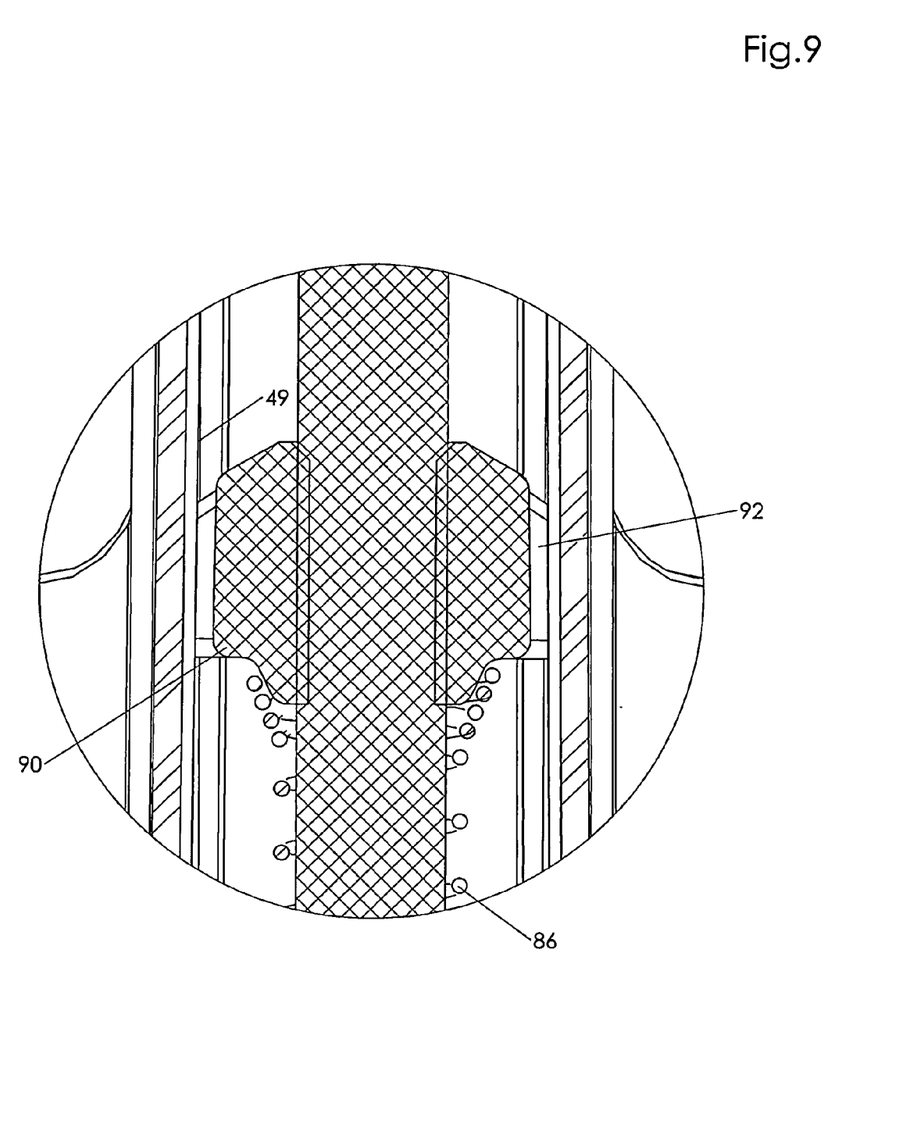
FIG. 9 is an expanded cross-sectional view showing the structure at the upper stop.
Figure 10:
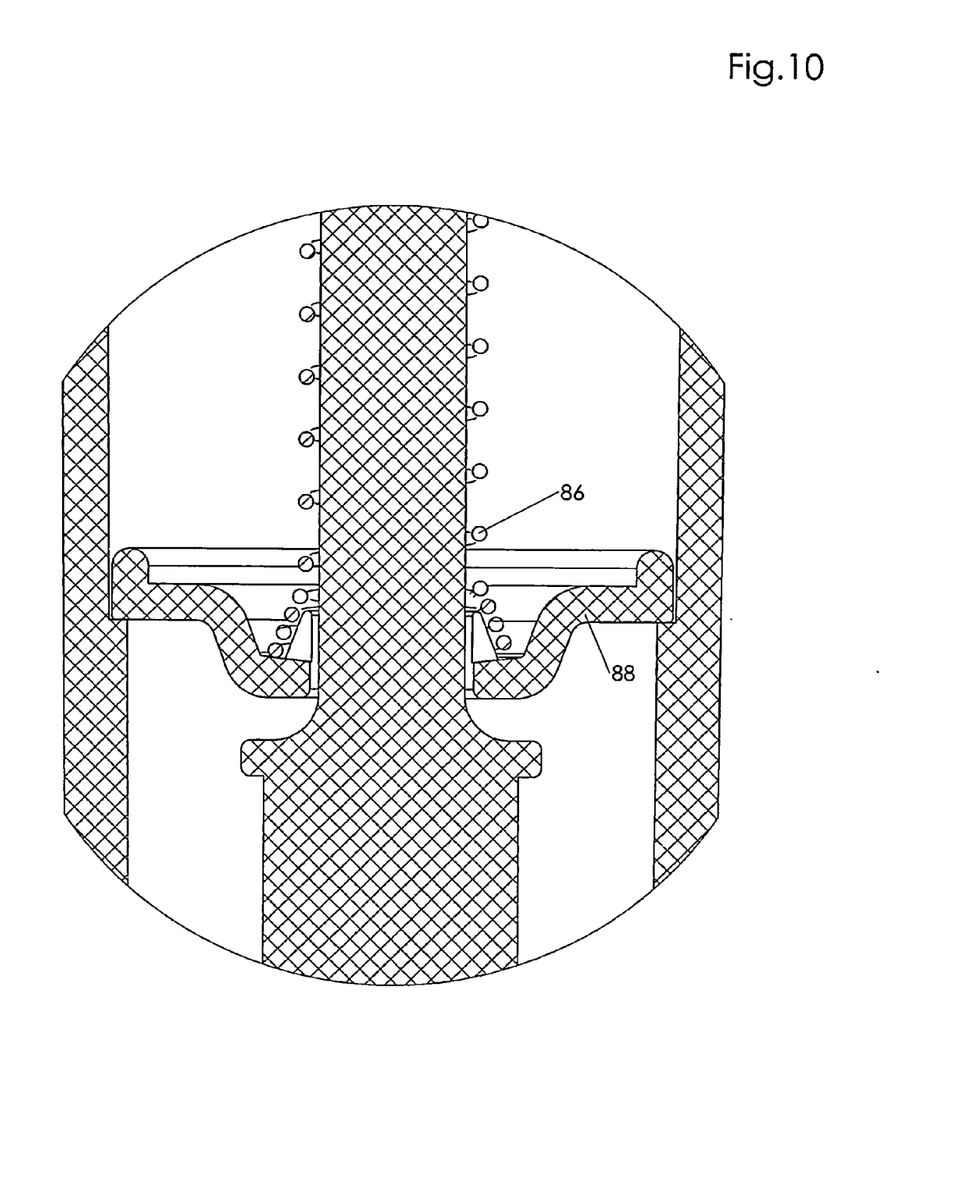
FIG. 10 is an expanded cross-sectional view illustrating the biasing of the bottom portion of the spring against a stop.
Figure 11:
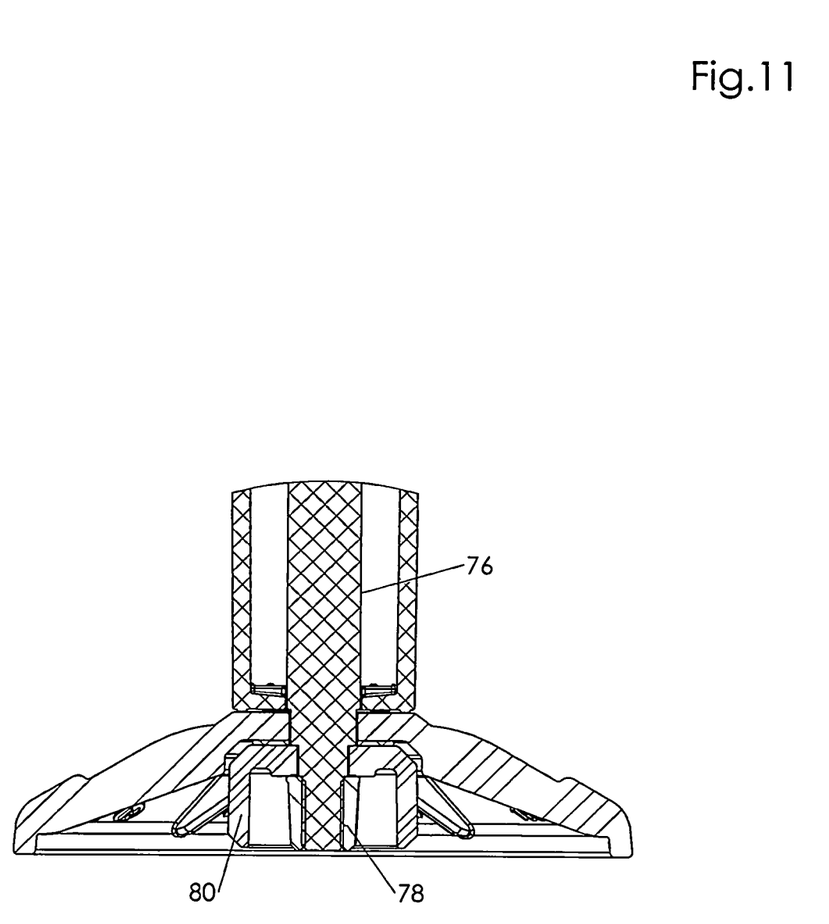
FIG. 11 is a cross-sectional view of a lower portion of the feeder.
Figure 12A:
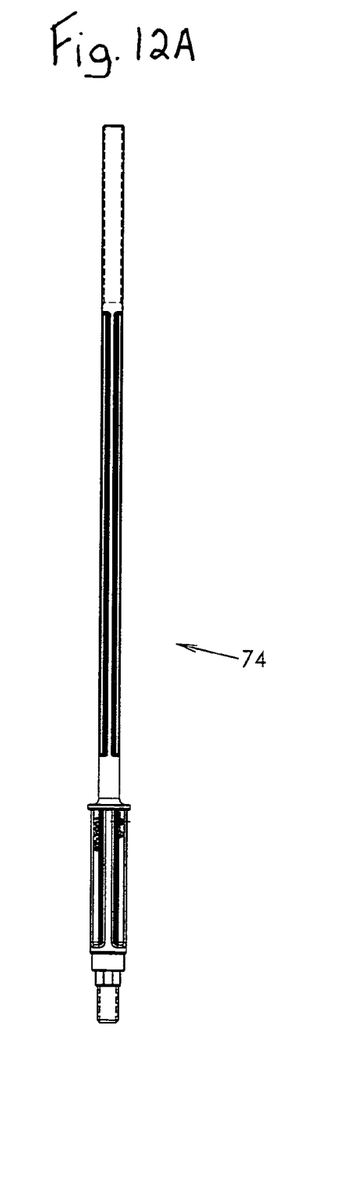
Figure 12B:
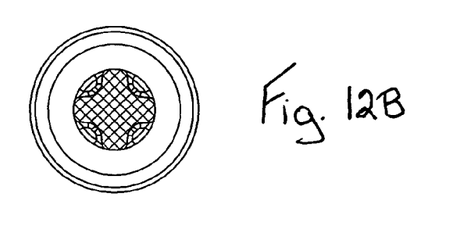
FIGS. 12B and 12C are cross-sectional views.
Figure 12C:
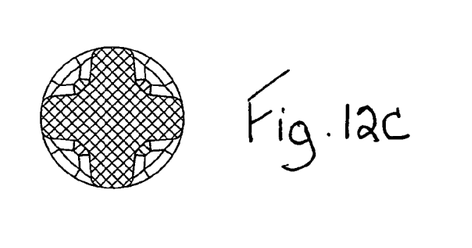

Referring to the drawings in greater detail and by reference characters thereto, there is illustrated a bird feeder which is generally designated by reference numeral 10.

Bird feeder 10 includes a feed container 42, a shroud 12 extending thereabout, a center tube 46 and a center rod 74.

Shroud 12 has an upper shroud portion generally designated by reference numeral 14 and a lower shroud portion 16. A center shroud portion 18 is intermediate the upper shroud portion 14 and lower shroud portion 16. As may be seen from the drawings, upper shroud portion 14 is formed of expanded metal 20. Lower shroud portion 16 is likewise formed of expanded metal 22. Center shroud portion 18 comprises a plurality of vertical ribs 24 connecting expanded metal 20 and 22. Between vertical ribs 24, there are provided openings 26.

Secured to the top of shroud 12 is a cover generally designated by reference numeral 28. Cover 28 includes a center aperture 30 through which a hanger may extend. Cover 28 includes a dome shaped upper portion 32, a downwardly extending side wall 34, a downwardly and outwardly extending wall 36 and terminates in a generally vertical wall 38. Cover 28 provides an overhang for the bird feeder.

Situated inwardly of shroud 12 is a feed container generally designated by reference numeral 42 and which includes a cylindrical outer wall 44. Situated interiorly of feed container 42 is a center tube 46. Center tube 46 is secured to outer wall 44 by means of flanges 48. It will be noted that interiorly of center tube 46 at flanges 48 are grooves 49.

Located at the bottom of feed container 42 are screw receptacles 50. A feed tray 52 has a downwardly extending wall 54 and is provided with a sloping bottom wall 56 to ensure that feed slides towards the exterior of the feeder. The bottom of the feed container is located at the center portion of shroud 12. A metal wire mesh 58 forms the lower portion of the feed container 42.

A bottom tube 62 is secured to base 52 by means of threads 66. Base 52 is in turn secured to feed tray 52 by means of screws 64 which engage in screw receptacles 50.

A base 68 includes diagonal wall segments 70 and a downwardly extending wall 72. The arrangement is such that shroud 12 seats thereon and any downward force on shroud 12 is transmitted to base 68.

Mounted internally of center tube 46 is a center rod 74. As may be seen, center rod 74 has an enlarged lower portion 76 and is engaged at its bottom by a nut 78. A dial 80 surrounds nut 78.

An upper portion of center rod 74 is generally designated by reference numeral 82 and includes threads 84 thereon (not shown). A spring member 86 surrounds the upper portion of rod 82. A lower stop 88 provides a seat for the lower end of spring 86 while an upper stop 90 does likewise for the other end of the spring. The ends of the springs are conical in configuration to keep the spring axis centered. Flanges 92 extending from upper stop 90 seat in grooves 49. Thus, using dial 80, center rod 74 can be rotated to change the distance between upper stop 90 and lower stop 88. This in turn will control the tension of the spring and the amount of weight which shroud 12 can support.

A fixed nut 94 is secured to the top end of center rod 74.

A hanger 96 is secured to an upper portion of center tube 46 by means of a nut 98. A cap 100 extends over the top of center tube 46 in order to protect vent channels 99 from food particles. As may be seen, hanger 96 has an aperture 102 located at an upper portion thereof to facilitate hanging of the bird feeder.

In operation, when a certain predetermined weight is present on shroud 12, the shroud will cause base 68 to move downwardly. In turn, the movement of shroud 12 will misalign the openings 26 with wire mesh 58 to deny access to the contents of feed container 42. The amount of weight required to do the same can be adjusted by means of dial 80 which will rotate center rod 74 and thereby adjust the tension on spring 86.

The feeder described above has several advantages. The feed container has a solid and transparent upper level to protect the feed from water with a lower section with openings so that the feed is exposed to be eaten by the birds. Only the lower section exposes a small amount of food to the elements which is quickly consumed and replaced by dry food.

The feeder is provided with ventilation so that hot air and humidity may escape from the top.

It will be noted that the base rotates freely so as not to change the adjustment setting for the spring. Thus, if it did not rotate freely, it would engage the central rod and change the adjustment setting. When birds land and take off, they tend to impart a rotational force on the shroud. The mounting of the base on a round portion 75 of the center portion allows for this rotation.

It is important that friction be minimized in the structure. Thus, the shape of the spring at both ends keeps the spring axis centered with respect to the axis of the center rod to minimize friction between the spring and the center rod. The center rod has a cruciform profile to minimize surface contact with the spring.

It will be understood that the above described embodiment is for purposes of illustration only and that changes and modifications may be made thereto without departing from the spirit and scope of the invention.

I claim:

1. A bird feeder comprising:
   a feed container having a side wall, a plurality of feed openings in said side wall;
   a shroud extending about said feed container, said shroud having feed openings therein, said feed openings being located between a bottom of said shroud and a top of said shroud, said feed openings being spaced from said top of said shroud by a distance equal to between 20% and 80% of the total height of said shroud;
   a cover secured to an upper portion of said shroud;
   a base, a center tube, and a center rod within said center tube, said center rod being secured to said base, said shroud resting on said base;
   a spring mounted about said center rod, said spring being biased at an upper end against a moveable stopper secured to said center rod, said spring being biased at a lower end against a fixed stopper secured to said center tube, an upper portion of said center rod being threaded, a non rotatable nut forming said upper movable stopper, said center tube having vertical grooves formed on an interior surface, said nut having flanges fitting within said grooves to prevent rotational movement of said nut and permit vertical movement of said nut; and
   the arrangement being such that said feed openings in said shroud and feed openings in said side wall of said feed container are normally aligned to permit access to feed within the container, said feed openings of said shroud moving out of alignment with said feed openings in said side wall when a predetermined weight is present on said shroud or cover.

2. The bird feeder of claim 1 wherein said feed container has an outwardly sloping bottom wall to direct feed to said feed openings in said side wall.

3. The bird feeder of claim 1 wherein an upper portion of said feed container is formed of a transparent material.

4. The bird feeder of claim 1 further including a dial secured to said center rod, said dial being located exteriorly of said base to thereby permit rotation of said center rod by rotation of said dial.

5. The bird feeder of claim 1 further including a hanger secured to said center tube, said hanger extending through an aperture in said cover.

6. The bird feeder of claim 1 wherein said openings in said side wall comprise a metal mesh extending between said base and said side wall.

7. The bird feeder of claim 1 wherein said feed container is secured to said center tube by means of a plurality of vertically extending flanges extending between said side wall and said center tube.

8. The bird feeder of claim 7 wherein said shroud is formed of expanded metal.

9. The bird feeder of claim 8 wherein said feed openings are spaced from a top of said shroud by a distance equal to between 35% and 65% of the total height of said shroud.

\* \* \* \* \*